United States Patent [19]

Keller

[11] Patent Number: 4,770,446

[45] Date of Patent: Sep. 13, 1988

[54] PRESSURE TANK CONNECTOR WITH INTERNAL CRIMPED TANK ATTACHMENT

[76] Inventor: Russell D. Keller, 149 N. Lotus Beach Dr., Portland, Oreg. 97217

[21] Appl. No.: 35,670

[22] Filed: Apr. 8, 1987

[51] Int. Cl.4 ............................................. F16L 3/04
[52] U.S. Cl. ................................. 285/158; 285/211; 285/222; 285/249; 285/179; 285/181
[58] Field of Search ............... 285/222, 202, 203, 248, 285/181, 249, 179; 220/85 R; 188/355

[56] References Cited

U.S. PATENT DOCUMENTS

| | | |
|---|---|---|
| 1,332,686 | 3/1920 | Reynolds . |
| 1,382,049 | 6/1921 | Aspinwall ............................ 285/222 |
| 1,718,610 | 6/1929 | Strama . |
| 2,327,656 | 8/1943 | Meek ...................................... 285/49 |
| 3,124,267 | 3/1964 | Cetrone ............................ 285/202 X |
| 3,659,880 | 5/1972 | Goldsobel ........................ 285/248 X |
| 3,754,731 | 8/1973 | Mackal ............................ 285/222 X |
| 3,915,479 | 10/1975 | Sotolongo ........................ 285/249 X |

4,400,020  8/1983  Keller ................................. 285/204

Primary Examiner—Dave W. Arola
Attorney, Agent, or Firm—Klarquist, Sparkman, Campbell, Leigh & Whinston

[57] ABSTRACT

A pressure tank connector apparatus is described, including a fitting body having an integral hollow sleeve portion projecting from one end thereof adapted to extend into an opening in the tank wall and be crimped about an internal flange or lip portion of the tank wall surrounding such opening with a sealing ring of elastomer compressed between a gripping flange portion of the fitting and the tank. As a result, the crimped tank attachment is positioned within the tank so it is protected from vandalism or damage from other causes. The pressure tank connector is coupled by an improved coupling to a flexible conduit such as a hose for supplying compressed air or other gas from the tank to an external device, such as the air brakes of a truck or other vehicle.

18 Claims, 1 Drawing Sheet

U.S. Patent  Sep. 13, 1988  4,770,446
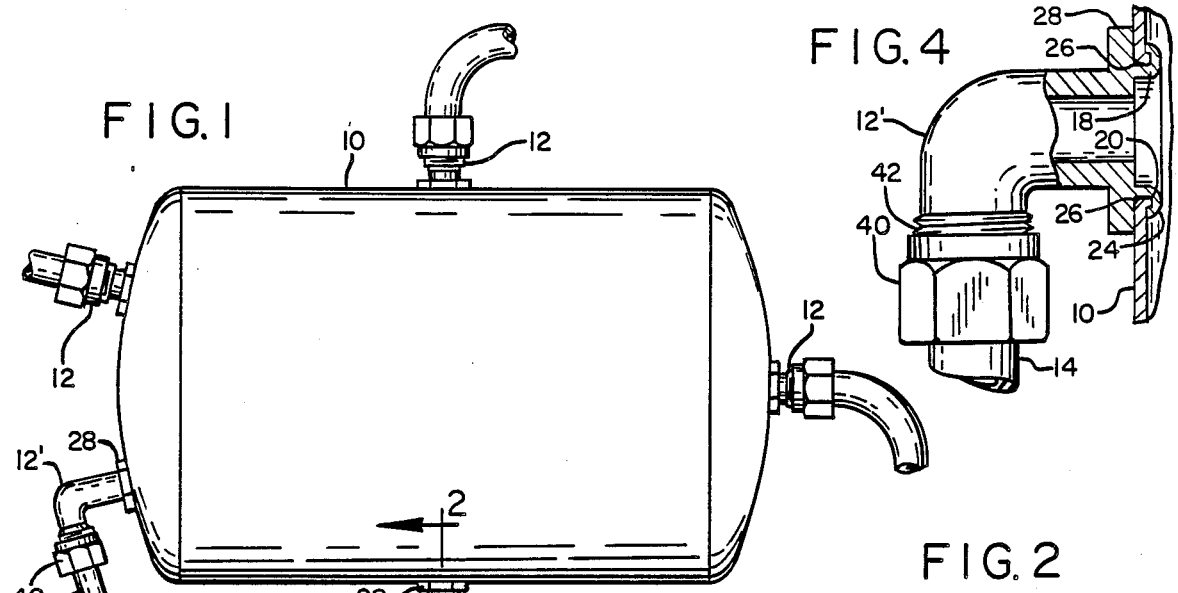
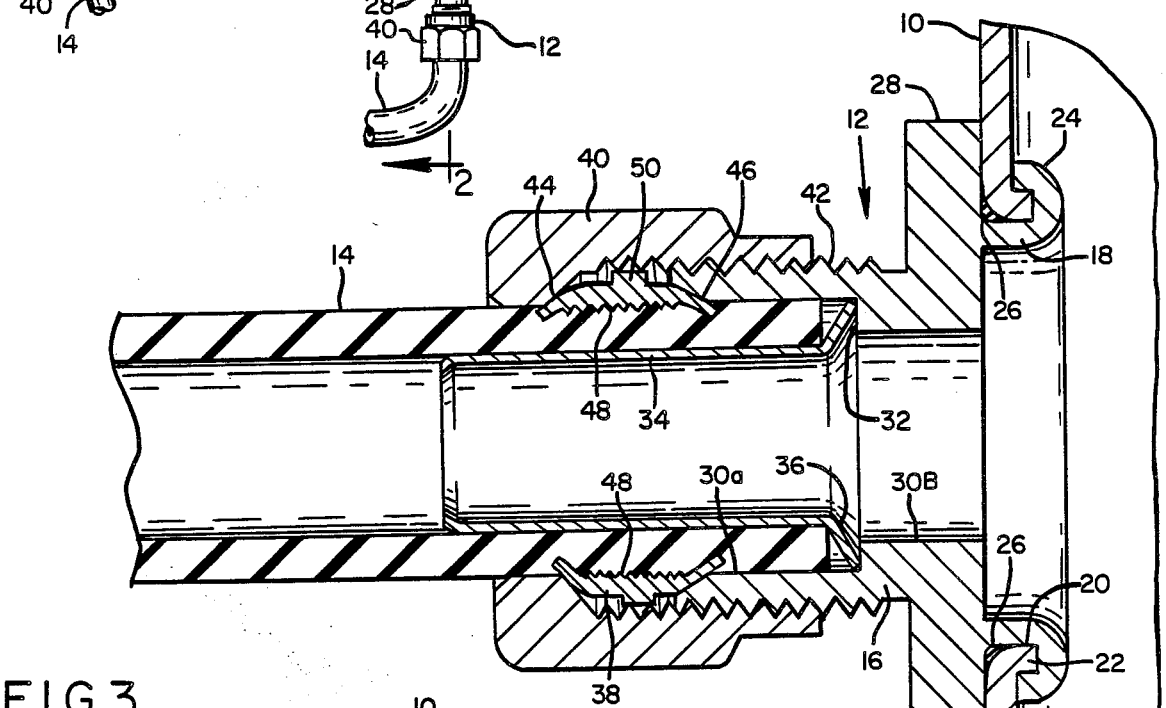
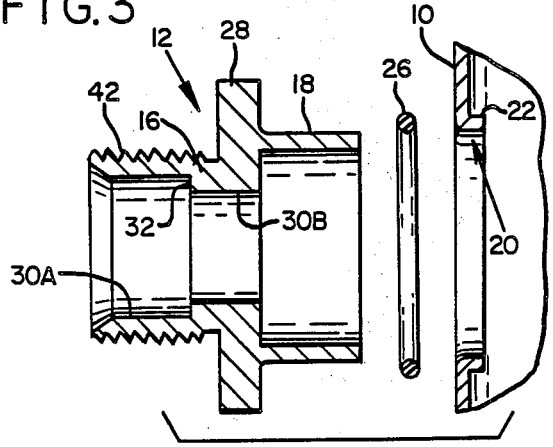

PRESSURE TANK CONNECTOR WITH INTERNAL CRIMPED TANK ATTACHMENT

BACKGROUND OF INVENTION

The pressure tank connector apparatus of the present invention is suitable for use on high pressure tanks containing gas under greater than atmospheric pressure such as the air tanks used in the air brake systems of trucks. Thus, the pressure tank connector of the present invention is suitable for use in connecting flexible conduits to pressurized tanks having working pressures many times that of atmospheric pressure. The pressure tank connector apparatus of the present invention is simpler, stronger, and less expensive than prior connectors and employs an internal crimped tank attachment for fastening the connector to the pressure tank, such crimped attachment being internal within the tank so that it is protected from damage due to vandalism, traffic accidents, and other causes.

It has previously been proposed in my earlier U.S. Pat. No. 4,400,020 of Keller issued Aug. 23, 1983, to provide a pressure tank connector with a fitting having an insert sleeve of steel embedded in a fitting body of aluminum alloy. The pressure connector fitting body is positioned within the tank, and the insert sleeve extends out of the tank through an opening in the tank wall. The outer end of the insert sleeve is crimped over an outwardly extending flange surrounding the tank opening to which the pressure tank connector is attached. As a result, the pressure tank connector has an external crimped tank attachment positioned outside of the tank which is subject to damage by vandalism, traffic accidents, or other causes. In addition, since the fitting body is provided with a threaded passage for receipt of a threaded elbow hose coupling, the user must provide such a hose coupling with proper threads to prevent leakage. Such elbow hose coupling must be adjusted into the proper angular position to prevent undesirable sharp bends in the hose. This angular adjustment is difficult with the prior connector because the crimped attachment does not rotate, and rotation of the elbow too much can strip the threads which may destroy the gas-tight seal. Also, the prior pressure tank connector was difficult to install since the fitting body is positioned within the tank and is larger than the attachment opening so it must be attached before the tank is completely formed. These problems are overcome by the present invention which employs a pressure tank connector having a fitting body and crimping sleeve formed integral of the same metal along with a hose coupling insert tube and clamp ring which are unthreaded, and having an internal crimped tank attachment means which can rotate for angular adjustment of any elbow-type connector and is positioned within the pressure tank so it is protected from damage. Also, the present connector is more easily installed on a completed tank.

U.S. Pat. No. 3,124,267 of Cetrone issued Mar. 10, 1964, and U.S. Pat. No. 2,327,656 of Meek issued Aug. 24, 1943, show pressure tank connectors or nonpressure liquid container plugs having external crimped tank attachment means so that they are similar to the above-discussed Keller patent in that the crimped attachment can easily be damaged by vandals or other causes since it is positioned outside the tank. Also of interest is U.S. Pat. No. 1,332,686 of Reynolds issued Mar. 2, 1920, and U.S. Pat. No. 1,718,610 of Strama issued June 25, 1929, which show barrel plugs having bung-receiving bushings having internal crimped attachments that extend into a nonpressure liquid container such as an oil drum or beer barrel but are not suitable as high-pressure connectors for coupling flexible conduits to air tanks or other pressurized gas containers having a working pressure several times atmospheric pressure.

SUMMARY OF INVENTION

It is, therefore, one object of the present invention to provide an improved pressure tank connector apparatus which is simple and inexpensive to manufacture but is strong enough to withstand a high pressure within the tank many times greater than atmospheric pressure.

Another object of the invention is to provide such a pressure tank connector apparatus which is less susceptible to damage of the attachment to the tank by providing its crimped attachment means internally within the tank.

A further object of the invention is to provide such a pressure tank connector apparatus with a fitting body and crimp sleeve formed integral of the same piece of metal for greater strength.

An additional object of the invention is to provide such a pressure tank connector apparatus which may be attached simply and quickly to the tank by mechanical bending or crimping to provide a crimped attachment which may be rotated for angular adjustment of an elbow-type connector.

Still another object of the invention is to provide such a pressure tank connector apparatus which is sufficiently strong and safe to use on the pressurized air tanks for the air brake systems of trucks or other vehicles.

A still further object of the invention is to provide such a pressure tank connector apparatus with an improved coupling for connection to a flexible conduit or hose in a simple and reliable manner without a threaded seal between the coupling and the pressure tank connector to prevent leakage.

DESCRIPTION OF DRAWINGS

Other objects and advantages of the present invention will be apparent from the following detailed description of a preferred embodiment thereof and from the attached drawings of which:

FIG. 1 is a side elevation view of a pressure tank employing the pressure tank connector apparatus of the present invention;

FIG. 2 is an enlarged, vertical section view taken along the line 2—2 of FIG. 1 showing the construction of one embodiment of the pressure tank connector apparatus installed on the air tank;

FIG. 3 is an exploded view in cross-section of the pressure tank connector apparatus of FIG. 2 unassembled but positioned to be installed in the opening in the wall of the pressure tank; and FIG. 4 is an enlarged section view of a second embodiment of the pressure tank connector apparatus with an elbow portion.

DESCRIPTION OF PREFERRED EMBODIMENT

As shown in FIG. 1, a pressure tank 10 containing a gas under a high working pressure many times that of normal atmospheric pressure such as a pressurized air tank at a pressure of 150 psi for the air brake system of a truck. The pressure tank includes a plurality of pressure tank connectors 12 and 12' made in accordance with the present invention which are coupled to flexible conduits such as hoses 14 connected to air brakes or other external devices.

The pressure tank connector apparatus 12 of the present invention is shown in FIGS. 2 and 3 and includes an annular fitting body portion 16 and a hollow sleeve portion 18 formed integral with such body portion from a single piece of suitable metal such as brass. The fitting sleeve projects from the inner end of the fitting body into the tank 10 through an opening 20 in the wall of the tank. An annular, internal flange or lip portion 22 is formed in the tank wall surrounding the opening 20 and extends into the tank. The inner end of the fitting sleeve portion 18 is bent outwardly over the lip 22 by crimping to attach the pressure tank connector to the tank at a crimp portion 24. An annular sealing ring 26 of elastomer material, such a rubber O-ring, is provided around the sleeve 18. A gripping flange portion 28 extends outwardly from the fitting body 16 and is provided with a hexagonal nut shape for engagement by a wrench to hold the connector 12 in a fixed position during crimping. The resilient seal member 26 is compressed between gripping flange 28 and the outer surface of the tank wall 10 to form a pneumatic seal at the edge of the opening 20 when the pressure tank connector apparatus is attached to the tank wall, as shown in FIG. 2. The unassembled connector parts for forming the pressure tank connector apparatus prior to assembly and fastening are shown in FIG. 3. It should be noted, of course, that the resilient seal ring 26 is of slightly larger diameter than the outer diameter of the sleeve 18 and the outer diameter of such sleeve is slightly smaller than the inner diameter of the tank wall opening 20. The sleeve 18 has a length of about 7/16 or 0.4375 inch and wall thickness of about ⅛ or 0.125 inch when made of type 464 brass.

A second embodiment 12' of the pressure tank connector includes a right angle elbow portion formed in the fitting body 16 between the gripping flange 28 and the threaded end 42, as shown in FIG. 4. In order to angularly adjust the elbow to the proper rotational position, the crimped attachment 24 may be rotated about the lip 22 by applying a sufficient force of, for example, greater than 25 foot-pounds to the flange 28. This angular adjustment of the connector does not destroy the seal provided by ring 26.

The fitting body 16 is provided with an axial passage 30 therethrough which communicates with the tank wall opening 20 into the tank. The passage 30 is provided with an internal shoulder 32 at a point intermediate the ends of the passage which divides the passage into a larger diameter outer portion 30A and a smaller diameter inner portion 30B. A tubular insert member 34 of a suitable metal such as stainless steel is provided within the connected end of the hose 14. This insert member has a flared end 36 which flares outwardly and engages the shoulder 32 to keep the insert within the passage 30A and to prevent the end of hose 14 from extending past shoulder 32. Thus, the shoulder 32 acts as a stop for the hose coupling.

A clamping ring 38 of suitable metal such as brass is provided about the hose 14 and positioned opposite the tubular insert 34. The clamp ring 38 is urged inwardly into contact with the outer surface of the hose 14 by a threaded fastening nut 40 which engages external threads 42 on the outer surface of the fitting body 16. The clamp ring 38 has a pair of sloped cam surfaces 44 and 46 at the opposite ends of such ring which engage the inner surface of the nut 40 and the inner surface of the end of large diameter passage portion 30A in the fitting body. Thus, as the fastening nut 40 is tightened, the cam surfaces 44 and 46 cause the clamping ring 38 to be urged inward to cause spaced annular ridges or teeth 48 on the inner surface of the ring to compress the hose and clamp it between such ring and the insert member 34. The hose 14 may be of rubber or reinforced plastic so that its outer surface is sufficiently soft to be penetrated by the clamp ridges 48 on the ring 30. It should be noted that an annular projection 50 extends outwardly from the middle of clamp ring 38 to prevent such clamp ring from passing under the outer end of the fitting body 16 so that such outer flange functions as a stop which engages the end of the fitting body and prevents overtightening of the coupling nut 40.

The resulting pressure tank connector apparatus 12 and its coupling means 34, 38 for coupling such connector to hose 14 are capable of withstanding extremely high pressure, including a working pressure of 150 psi and a safety factor of five times such working pressure, or a maximum fail safe pressure of 750 psi which is over 50 times normal atmospheric pressure.

It will be obvious to those having ordinary skill in the art that many changes may be made in the details of the above-described embodiment of the invention without departing from the spirit of the invention. For example, other types of couplings can be employed than the clamp ring 38 and insert tube 34 for coupling the pressure tank connector to the hose. Therefore, the scope of the present invention should be determined by the following claims.

I claim:

1. Container tank connector apparatus, comprising:
   connector fitting means for sealing an opening in the wall of a container tank surrounded by an internal flange portion of said wall extending inward within said tank to provide a fluid connection, and for coupling an external fluid conduit to the interior of said tank through said connection;
   said fitting means including a fitting body which is adapted to be positioned outside said tank and has a passageway therethrough;
   a coupling means for coupling one end of said fitting means to said conduit; and
   attachment means for mechanically attaching said fitting means to the tank wall through said opening at said internal flange portion, including a hollow sleeve portion formed integral with said fitting body and projecting from the other end of said fitting means, said sleeve portion extending through said opening in the tank wall so that the sleeve portion extends into said tank beyond the internal flange portion and is bent over the said internal flange portion of said wall to attach said fitting means to said tank.

2. Connector apparatus in accordance with claim 1 in which the fitting body includes a gripping flange extending outwardly from said fitting body at the junction with said sleeve portion.

3. Connector apparatus in accordance with claim 2 which also includes elastomer seal means provided around said sleeve portion and positioned to be compressed between said gripping flange and the tank wall.

4. Connector apparatus in accordance with claim 3 in which the fitting body has an elbow portion and the sleeve portion being bent over the internal flange portion to attach the fitting body to the tank wall which enables angular adjustment of the elbow portion without destroying the seal means.

5. Connector apparatus in accordance with claim 1 in which the fitting body includes an internal shoulder extending into said passageway for engagement with a tubular insert provided in the end of a flexible hose forming the conduit.

6. Connector apparatus in accordance with claim 5 in which the coupling means includes a nut threadedly engaging external threads on the fitting body and causing a clamping ring positioned around the hose opposite the tubular insert to clamp the hose between said ring and said insert for coupling the hose to said fitting body.

7. Connector apparatus in accordance with claim 1 in which said sleeve portion is of a greater inner diameter than said passageway.

8. Connector apparatus in accordance with claim 1 in which the fitting body provides a high pressure gas connection to the tank.

9. Pressure tank apparatus, comprising:
a pressure tank for holding a gas under high pressure greater than atmospheric pressure;
connector fitting means for sealing an opening in the wall of said tank surrounded by an internal flange portion extending inward within said tank to provide a high pressure fluid connection, and for coupling an external fluid conduit to the interior of said tank through said connection;
said fitting means including a fitting body which is positioned outside said tank and has a passageway therethrough;
a coupling means for coupling one end of said fitting means to said conduit; and
attachment means for attaching said fitting means to the tank wall through said opening at said internal flange poriton, including a hollow sleeve portion formed integral with said fitting body and projecting from the other end of said fitting means, said sleeve portion extending through said opening in the tank wall so that the sleeve portion extends into said tank beyond the internal flange portion and is bent over the said internal flange portion of said wall to attach said fitting means to said tank.

10. Tank apparatus in accordance with claim 9 in which the fitting body includes a gripping flange extending outwardly from said fitting body at the junction with said sleeve portion.

11. Tank apparatus in accordance with claim 10 which also includes elastomer seal means provided around said sleeve portion and compressed between said gripping flange and the tank wall.

12. Tank apparatus in accordance with claim 11 in which the fitting body has an elbow portion and the sleeve portion being bent over the internal flange portion provides an attachment means which enables angular adjustment of the elbow portion without destroying the seal means.

13. Tank apparatus in accordance with claim 9 in which the fitting body includes an internal shoulder extending into said passageway for engagement with a tubular insert provided in the end of a flexible hose forming said conduit.

14. Tank apparatus in accordance with claim 13 in which the coupling means includes a nut threadedly engaging the fitting body and causing a clamping ring positioned around the hose opposite the tubular insert to clamp the hose between said, ring and said insert for coupling the hose to said fitting body.

15. Tank apparatus in accordance with claim 9 in which said sleeve portion is of a greater inner diameter than said passageway.

16. Tank apparatus in accordance with claim 15 in which the air tank is connected to the air brake system of a truck.

17. Tank apparatus in accordance with claim 9 in which the fitting body is made of brass metal.

18. Tank apparatus in accordance with claim 9 in which the pressure tank is an air tank containing compressed air.

* * * * *